United States Patent

Nozawa

[11] Patent Number: 6,014,177
[45] Date of Patent: Jan. 11, 2000

[54] VIDEO DISPLAY APPARATUS HAVING PHASE-LOCKED LOOP USED FOR SYNCHRONIZING A HORIZONTAL SCAN FREQUENCY WITH A SYNCHRONIZING INPUT SIGNAL FREQUENCY

[75] Inventor: Shinji Nozawa, Kanagawa, Japan

[73] Assignee: NEC Corporation, Tokyo, Japan

[21] Appl. No.: 08/979,699

[22] Filed: Nov. 26, 1997

[30] Foreign Application Priority Data

Nov. 28, 1996 [JP] Japan ................................ 8-317594

[51] Int. Cl.[7] ......................... H04N 5/06; H04N 5/12
[52] U.S. Cl. .................... 348/540; 348/536; 348/531; 348/544; 331/11; 327/156
[58] Field of Search ..................... 315/399, 369, 315/382.1, 370; 345/212, 213; 348/531, 536, 540, 541, 542, 543, 544, 533, 147; 331/4, 11; 327/156; 358/158, 159; H04N 5/12, 5/04, 5/06

[56] References Cited

U.S. PATENT DOCUMENTS

| | | | |
|---|---|---|---|
| 4,263,614 | 4/1981 | Tominaga | 348/813 |
| 4,626,911 | 12/1986 | Sasaki et al. | 348/473 |
| 4,634,939 | 1/1987 | Dietz | 315/399 |
| 4,933,959 | 6/1990 | Knechtel | 375/376 |
| 4,996,596 | 2/1991 | Hirao et al. | 348/542 |
| 5,121,206 | 6/1992 | Shibayama et al. | 348/525 |
| 5,315,387 | 5/1994 | Tachibana | 348/521 |
| 5,381,116 | 1/1995 | Nuckolls | 331/1 |
| 5,825,431 | 10/1998 | Walker | 348/536 |
| 5,889,500 | 3/1999 | Chuang | 345/10 |
| 5,912,713 | 1/1999 | Tsunoda | 348/540 |

FOREIGN PATENT DOCUMENTS 62-159980 7/1987 Japan.

Primary Examiner—Sherrie Hsia
Assistant Examiner—Wesner Sajous
Attorney, Agent, or Firm—Foley & Lardner

[57] ABSTRACT

A video display apparatus comprises a phase-locked loop receiving a horizontal synchronous signal for generating an oscillation signal following the frequency of the horizontal synchronous signal, a tracking circuit for generating a tracking control signal for moving the frequency of the oscillation signal into a predetermined capture range of the phase-locked loop when the frequency of the horizontal synchronous signal changes, so that the frequency of the oscillation signal follows the frequency of the horizontal synchronous signal, and an output circuit receiving and amplifying the oscillation signal to output a horizontal output signal. The tracking circuit includes a switch circuit receiving the horizontal synchronous signal and the oscillation signal to supply the horizontal synchronous signal as a selected signal to the tracking circuit when the phase-locked loop is in an unlocked condition, and to supply the oscillation signal as the selected signal to the tracking circuit when the phase-locked loop is in a locked condition.

7 Claims, 8 Drawing Sheets

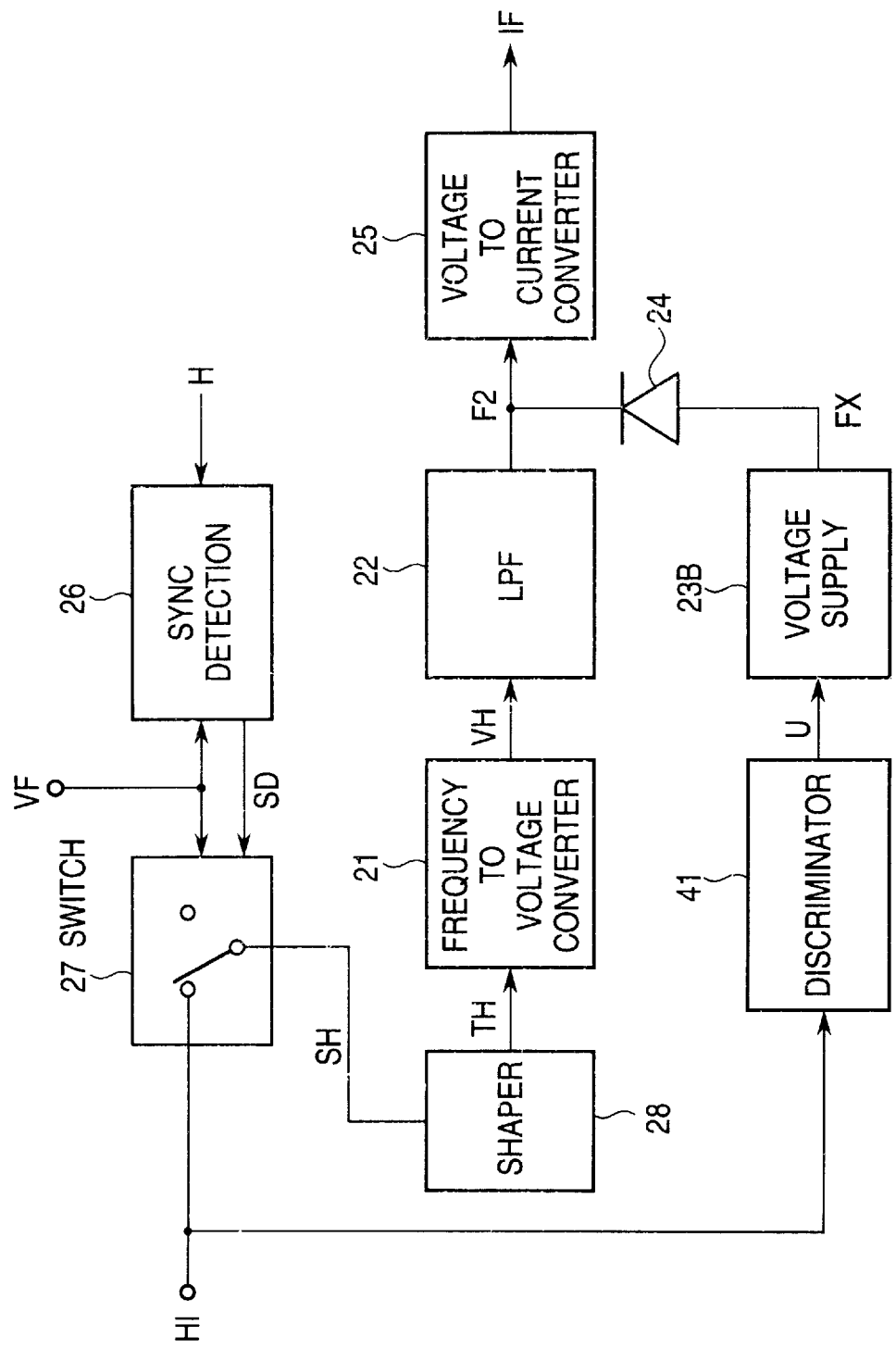
Fig. 9   2D TRACKING CIRCUIT

VIDEO DISPLAY APPARATUS HAVING PHASE-LOCKED LOOP USED FOR SYNCHRONIZING A HORIZONTAL SCAN FREQUENCY WITH A SYNCHRONIZING INPUT SIGNAL FREQUENCY

BACKGROUND OF THE INVENTION

1. Field of the Invention

The present invention relates to a video display apparatus, and more specifically to a video display apparatus having a phase-locked loop used for bringing a horizontal scan signal frequency used in a television receiver and a personal computer display, into synchronism with a synchronizing input signal frequency. In this specification, "phase-locked loop" will be abbreviated to "PLL".

2. Description of Related Art

In video display apparatus of this type, for example, in a television receiver monitor, a horizontal scan signal for a display is generated in synchronism with a horizontal synchronous signal which is separated from an input composite video signal by a synchronous signal separation circuit. Since it is not preferred that the horizontal scan signal is influenced by noises and others included in the horizontal synchronous signal, a PLL circuit is generally used in order to eliminate the disturbance as mentioned above and in order to ensure a stable horizontal synchronous signal frequency.

As well known, the PLL circuit includes a voltage or current controlled oscillator and a phase comparator having an output connected to a low pass filter (LPF). The phase comparator compares an output of the oscillator with a leading edge or a center of a synchronous pulse which is reference signal. An error voltage or current indicative of the result of the comparison, is integrated by the low pass filter, and supplied as a control voltage or current to the oscillator, to change the phase and the frequency of the oscillator until the output frequency of the oscillator is brought into phase with the synchronous pulse.

Referring to FIG. 1, there is shown, in a block diagram form, one prior art video display apparatus using the PLL circuit, which was disclosed in Japanese Patent Application Pre-examination Publication No. JP-A-62-159980 corresponding to U.S. Pat. No 4,634,939, the content of which is incorporated by reference in its entirety into this application.

The shown prior art video display apparatus includes a PLL circuit 1 generating an oscillation signal VF following the frequency of an input horizontal synchronous signal HI, a tracking circuit 2 for outputting a tracking control signal IF for moving the oscillation frequency into a predetermined capture range at the time of an abrupt change of the frequency of the synchronous signal HI, as when the synchronous signal HI is switched over, and for maintaining the oscillation frequency when no synchronous signal HI is supplied, and an output circuit 2 receiving the oscillation signal VF to amplify the oscillation signal VF to a predetermined output level and to output the amplified signal as a horizontal output signal HO.

The PLL circuit 1 includes a waveform shaper 11 receiving the horizontal synchronous signal HI to output a horizontal synchronous pulse H having a constant pulse width, a phase detector 12 for detecting a phase difference between the horizontal synchronous pulse H and the oscillation signal VF, to output a phase difference signal P1, a low pass filter 13 for integrating the phase difference signal P1 to convert the phase difference signal P1 into a current signal F1, a current adder 14 for adding the current signal F1 and the tracking control signal IF, which is also a current signal, to generate a control signal C, and a current controlled oscillator 15 responding to the control signal C to oscillate the oscillation signal VF.

The tracking circuit 2 includes a frequency-to-voltage converter 21 receiving the horizontal synchronous pulse H to convert the frequency of the horizontal synchronous pulse H into a voltage signal VH, a low pass filter 22 for integrating the voltage signal VH to output an integration signal F2, a voltage supply 23 for outputting a voltage signal FL which causes the oscillator 15 to oscilliate at a minimum free running frequency, a clipping diode 24, and a voltage-to-current converter 25 for converting the voltage of the signals F2+FL into the tracking control signal IF which is a current signal.

The output circuit 3 comprises a phase shifter 31 responding to a control signal F3 to phase-shift the oscillation signal VF and to output a phase-shifted signal PS, an output amplifier 32 responding to the phase-shifted signal PS to output a horizontal deflection output signal HO and a blanking pulse PB, a phase detector 33 for detecting a phase difference between the blanking pulse PB and the oscillation signal VF to generate a phase difference signal P2, and a low pass filter 34 for integrating the phase difference signal P2 to generate the control signal F3.

Now, an operation of the prior art video display apparatus will be described with FIG. 1 and FIG. 2 which is a timing chart illustrating waveforms of various signals in the circuit shown in FIG. 1.

First, when the PLL circuit 1 is in a locked condition, namely when the frequency of the horizontal synchronous pulse H is substantially coincident with the frequency of the oscillation signal VF, the waveform shaper 11 of the PLL circuit 1 shapes the received input horizontal synchronous signal HI to output the horizontal synchronous pulse H having a constant pulse width, which is supplied to the phase detector 12 and the frequency-to-voltage converter 21. The phase detector 12 compares the phase of the horizontal synchronous pulse H and the phase of the oscillation signal VF which is the output of the PLL circuit 1, and outputs the phase difference signal P1. The low pass filter 13 integrates the phase difference signal P1 and outputs the current signal F1. In the above mentioned locked condition, the tracking control signal IF is at a constant value, and therefore, the current adder 14 adds the tracking control signal IF of the constant value and the current signal F1, to generate the control signal C. The current controlled oscillator 15 oscillates and generates the oscillation signal VF having the frequency corresponding to the current value of the control signal C. This oscillation signal VF is supplied to the phase detector 12 and the phase shifter 31 and the phase detector 33 of the output circuit 3. Thus, the PLL circuit 1 operates to the effect that the phase difference signal P1 outputted from the phase detector 12 becomes zero, namely, the frequency of the oscillation signal VF generated by the current controlled oscillator 5 becomes coincident with the frequency of the horizontal synchronous signal HI.

On the other hand, the frequency-to-voltage converter 21 of the tracing circuit 2 converts the frequency of the received horizontal synchronous pulse H into the voltage signal VH, which is supplied to the low pass filter 22. The low pass filter 22 eliminates a high frequency component such as noises and others, included in the voltage signal VH, and integrates the voltage signal VH to generate the integration signal F2 to the voltage-to-current converter 25. The voltage-to-current converter 25 converts the integration signal F2 into a current value and generates the tracking control signal IF having the current value in proportion to the frequency of the horizontal synchronous pulse H.

The minimum oscillation frequency voltage supply 23 generates the minimum voltage signal FL for setting the frequency of the current controlled oscillator 15 to a constant value, in this case, to a minimum value which is equal to or lower than a lower frequency of a normal operation, when no horizontal synchronous pulse H is supplied. The minimum voltage signal FL is supplied through the clipping diode 24 to the voltage-to-current converter 25.

Here, when the PLL circuit 1 is unlocked to be brought into an unlocked condition because of a frequency change of the input horizontal synchronous signal H1 or another reason, the tracking circuit 2 generates the tracking control signal IF in proportion to the frequency of the horizontal synchronous pulse H. The tracking control signal IF is supplied to the current adder 14. In the unlocked condition, since the phase difference signal P1, namely, the integration signal F1, is almost zero, the current adder 14 outputs the tracking control signal IF as it is, as the control signal C to the current controlled oscillator 15. Accordingly, the current controlled oscillator 15 operates in an open loop control mode of setting the oscillation frequency under control of the tracking control signal IF, and generates the oscillation signal VF. If the oscillation signal VF becomes almost the frequency of the horizontal synchronous pulse H and enters in the capture range of the PLL circuit 1, the PLL circuit 1 is put in the locked condition as mentioned above.

Alternatively, when the input horizontal synchronous signal H1 is not supplied, namely, when no horizontal synchronous pulse H is supplied from the waveform shaper 2, the integration signal F2 becomes zero, so that the diode 24 becomes conductive, and therefore, the voltage signal FL generated in the voltage supply 23 is supplied through the diode 24 to the voltage-to-current converter 25. Thus, the voltage-to-current converter 25 outputs the tracking control signal IF corresponding to the voltage signal FL. Accordingly, the current controlled oscillator 15 operates in a free running oscillation in an open loop control mode of setting the oscillation frequency under control of the tracking control signal IF corresponding to the voltage signal FL, and generates the oscillation signal VF of the minimum oscillation frequency.

The phase detector 33 in the output circuit 3 detects a phase difference between the oscillation signal VF and the blanking pulse PB outputted from the output amplifier 32, to output the phase difference signal P2. The low pass filter 34 integrates the phase difference signal P2 to output the control signal F3. The phase shifter 31 is controlled by the control signal F3 to shift the phase of the oscillation signal VF supplied from the PLL circuit 1, by a constant amount, and to output the phase-shifted signal PS to the output amplifier 32. This output amplifier 32 outputs the horizontal output signal HO which is a deflecting current signal for a deflecting coil (not shown), so that a cathode ray tube (CRT) which is a display means, is horizontally scanned. Furthermore, the output amplifier 32 outputs the blanking pulse PB which is obtained by delaying the horizontal output signal HO by a predetermined period and which corresponds to a blanking period in the horizontal scanning. The blanking pulse PB is supplied to the phase detector 33.

In the prior art video display apparatus mentioned above, the tracking circuit 2 performs the frequency tracking control of the current controlled oscillator 15 by the tracking control signal which is generated by frequency-to-voltage-converting the horizontal synchronous pulse H having the constant pulse width obtained by use of the waveform shaper 11. On the other hand, in the composite video signal to be displayed, no horizontal synchronous signal does not exist during a period of a vertical synchronous signal. Therefore, during the vertical synchronous signal period (namely, the blanking period) and just after the vertical synchronous signal period, the frequency-to-voltage-conversion is carried out in a condition in which no horizontal synchronous signal exists. Accordingly, during the vertical synchronous signal period, there occurs a frequency conversion error which causes the value of the voltage signal VH to become lower than the value in a horizontal synchronous signal period. As a result, the tracking control signal IF changes, with the result that the oscillation signal VF also changes, and an image distortion due to a phase deviation occurs in an upper portion of a display screen which corresponds to a period just after the blanking period. As a countermeasure, the frequency conversion error in the blanking period is suppressed by integrating the voltage signal VH by the low pass filter 22 constructed to include a large capacitance capacitor and therefore to have a large time constant.

However, if the low pass filter 22 is constructed to include a large capacitance capacitor and therefore to have a large time constant in order to prevent the image distortion attributable to missing of the horizontal synchronous signal in the blanking period, a frequency change tracking capability becomes low when the frequency of the horizontal synchronous signal is changed. As a result, in a certain period just after the change of the horizontal synchronous signal frequency, a horizontal size varies in the display screen.

Furthermore, when the horizontal synchronous signal is not supplied, the free running oscillation frequency is set by the constant voltage supplied through the clipping diode to the output side of the low pass filter of the tracking circuit. Here, this constant voltage is required to be set lower than the voltage of the integration signal which is outputted from the low pass filter and which corresponds to the lowest frequency in the normal operation, in order to prevent the constant voltage from reversely flowing. Accordingly, it is a matter of course that the free running oscillation frequency is not greater than the lowest frequency mentioned above.

SUMMARY OF THE INVENTION

Accordingly, it is an object of the present invention to provide a video display apparatus having a phase-locked loop, which has overcome the above mentioned defects of the conventional one.

Another object of the present invention is to provide a video display apparatus having a phase-locked loop, having an improved property of tracking the horizontal synchronous signal frequency, so that even just after change of the horizontal synchronous signal frequency, the horizontal synchronous signal frequency is quickly tracked, thereby to realize a stable image display having no horizontal size variation or fluctuation.

Still another object of the present invention is to provide a video display apparatus having a phase-locked loop, capable of freely setting the free running oscillation frequency.

The above and other objects of the present invention are achieved in accordance with the present invention by a video display apparatus comprising a phase-locked loop receiving a horizontal synchronous signal for generating an oscillation signal following the frequency of the horizontal synchronous signal, a tracking circuit for generating a tracking control signal for moving a frequency of the oscillation signal into a predetermined capture range of the phase-locked loop when the frequency of the horizontal synchronous signal changes, so that the frequency of the oscillation signal follows the frequency of the horizontal synchronous signal, and on output circuit receiving and amplifying the oscillation signal to output a horizontal output signal, the tracking circuit including a switch circuit receiving the horizontal synchronous signal and the oscillation signal to supply the horizontal synchronous signal as a selected signal to the tracking circuit when the phase-locked loop is in an unlocked condition, and to supply the oscillation signal as the selected signal to the tracking circuit when the phase-locked loop is in a locked condition.

The above and other objects, features and advantages of the present invention will be apparent from the following description of preferred embodiments of the invention with reference to the accompanying drawings.

BRIEF DESCRIPTION OF THE DRAWINGS

FIG. 9 is a block diagram of still another modification of the tracking circuit in the circuit shown in FIG. 3;

DESCRIPTION OF THE PREFERRED EMBODIMENTS

Figure 3:
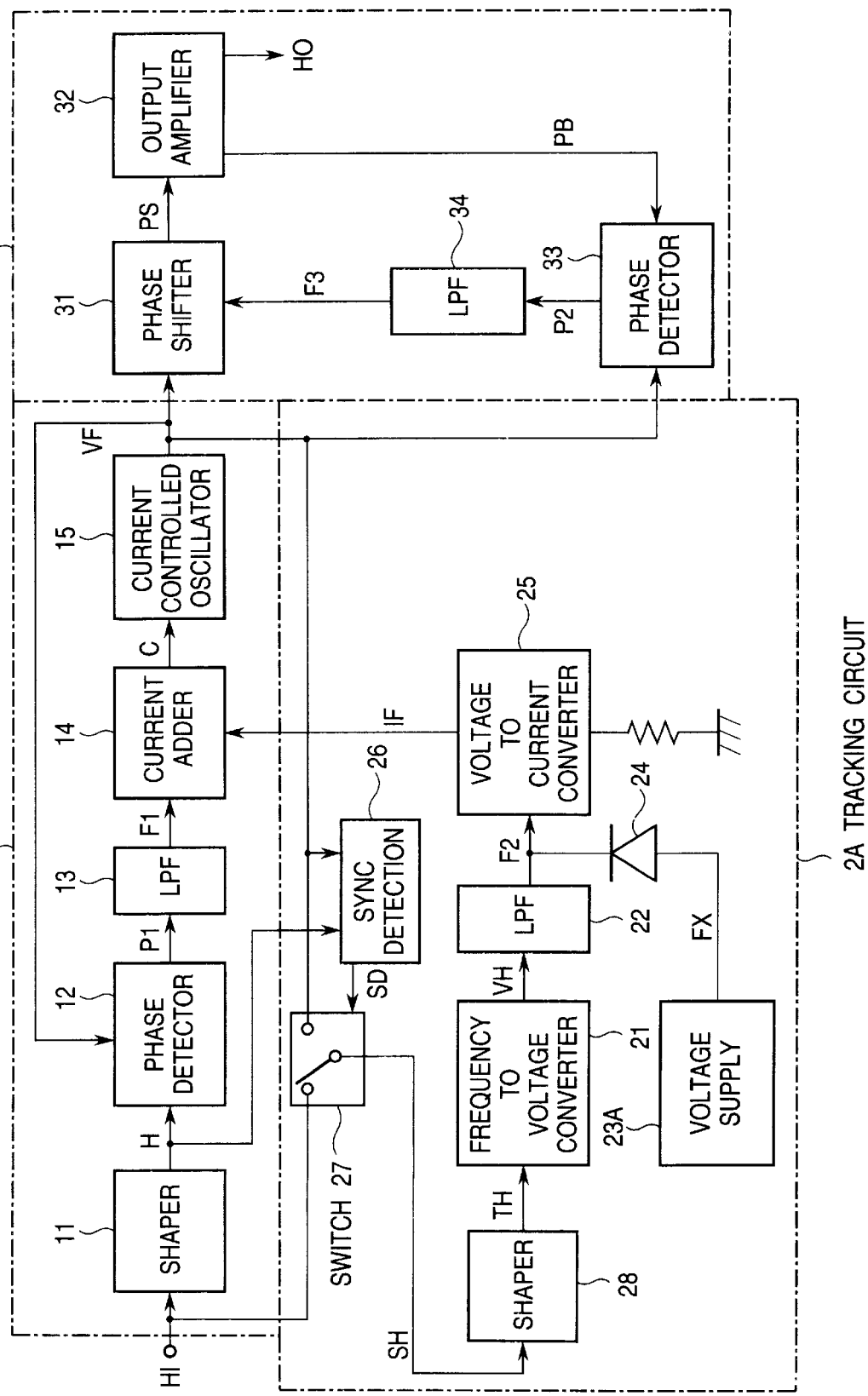
FIG. 3 is a block diagram illustrating a first embodiment of the video display apparatus in accordance with the present invention, using the PLL circuit.

Referring to FIG. 3, there is shown a block diagram illustrating a first embodiment of the video display apparatus in accordance with the present invention, using the PLL circuit. In FIG. 3, elements similar to those shown in FIG. 1 are given the same Reference Numerals, and explanation thereof will be omitted.

Figure 1:
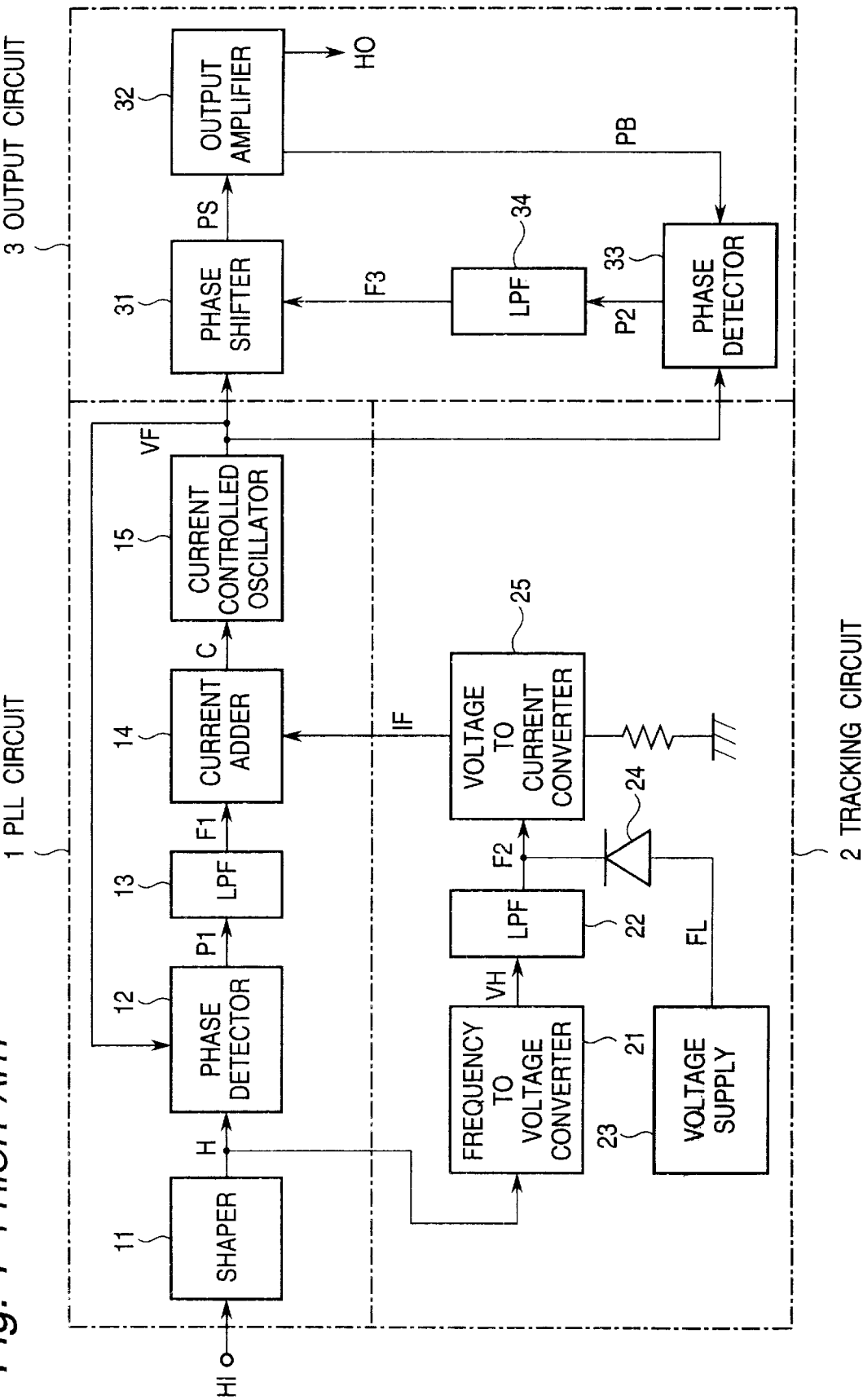
FIG. 1 is a block diagram illustrating one prior art video display apparatus using the PLL circuit.
Figure 2:
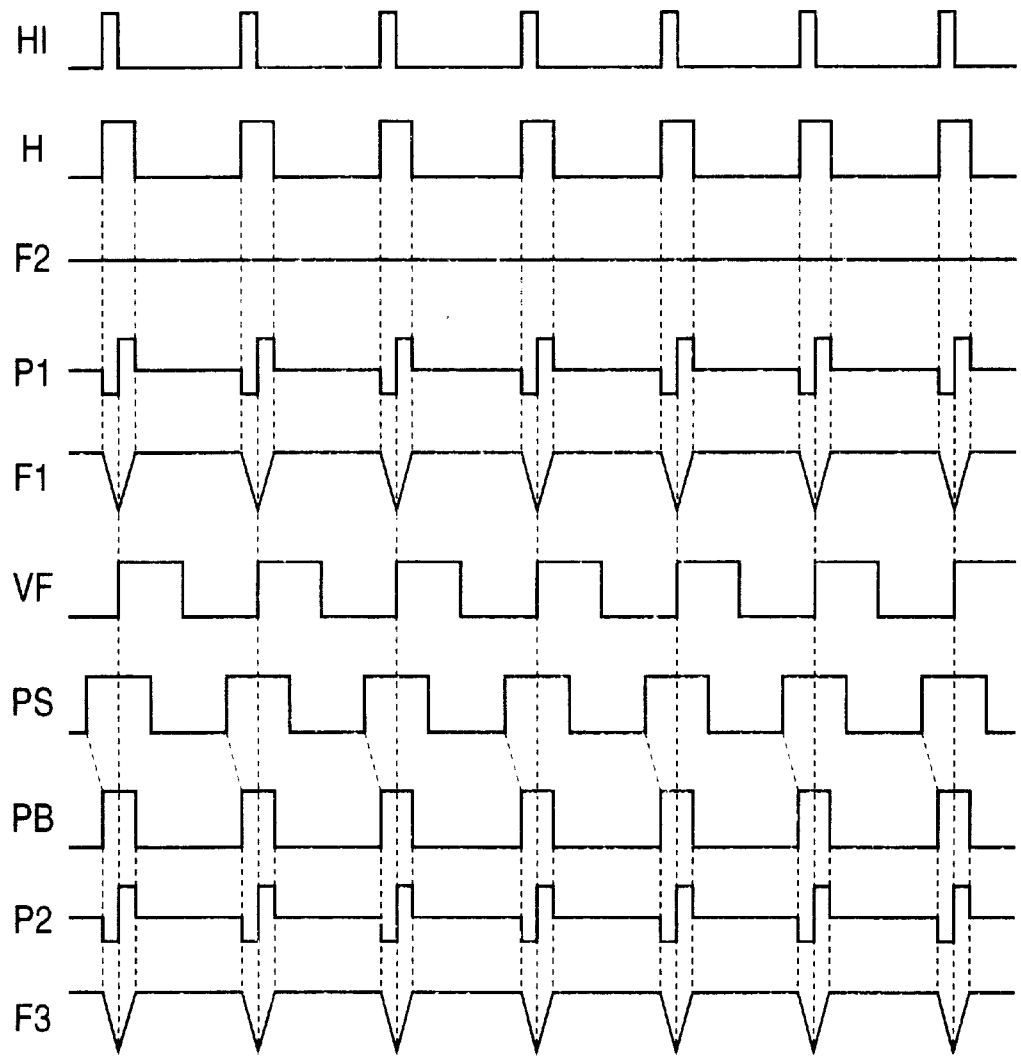
FIG. 2 is a timing chart illustrating waveforms of various signals in the circuit shown in FIG. 1.

As seen from comparison between FIG. 1 and 3, the embodiment of the video display apparatus shown in FIG. 3 comprises the PLL circuit 1 and the output circuit 3 similar to those of the prior art example, and a tracking circuit 2A which is provided in place of the tracking circuit 2 in the prior art example and which is configured to generate the tracking control signal IF by selectively receiving either the input horizontal synchronous signal HI or the oscillation signal VF in accordance with a synchronism detection signal indicating whether or not the PLL circuit is in a locked condition. Therefore, explanation of the PLL circuit 1 and the output circuit 3 will be omitted.

The tracking circuit 2A comprises the frequency-to-voltage converter 21, the low pass filter 22, the clipping diode 24, and the voltage-to-current converter 25, similarly to the tracking circuit 2 in the prior are example. In addition to these function elements, the tracking circuit 2A further comprises a synchronism detecting circuit 26 receiving the horizontal synchronous pulse H and the oscillation signal VF for generating a synchronism detection signal SD, a switch circuit 27 receiving the input horizontal synchronous signal HI and the oscillation signal VF and controlled by the synchronism detection signal SD to select one of the input horizontal synchronous signal HI and the oscillation signal VF so as to output a selected signal SH, a waveform shaper 28 receiving and shaping the selected signal SH to output a pulse signal TH having a constant pulse width, and a voltage supply 23A which is provided in place of the voltage supply 23 provided in the tracking circuit 2 in the prior art example, and which is so configured to output an arbitrary voltage FX.

Now, an operation of the embodiment of the video display apparatus will be described with reference to FIG. 3 and FIGS. 4A and 4B which are timing charts showing waveforms of various signals in the circuit shown in FIG. 3, while particularly paying attention to portions different from the prior art example.

As mentioned above, the horizontal synchronous pulse H and the oscillation signal VF are supplied to the synchronism detecting circuit 26. At an initial stage of application of the horizontal synchronous signal HI, the PLL circuit is in the unlocked condition in which the oscillation signal VF is not in synchronism with the horizontal synchronous signal HI, as shown in FIG. 4A. Therefore, the synchronism detecting circuit 26 outputs the synchronism detecting signal SD of a low level to the switch circuit 27, as will be described in detail later. In response to the low level synchronism detecting signal SD, the switch circuit 27 selects the horizontal synchronous signal HI and outputs the horizontal synchronous signal HI as the selected signal SH to the waveform shaper 28. The waveform shaper 28 shapes the selected signal SH into the pulse signal TH having the constant pulse width, which is supplied to the frequency-to-voltage converter 21. The frequency-to-voltage converter 21 converts the frequency of the pulse signal TH into a voltage which is outputted as the signal VH. Similarly to the prior art example, the signal VH is integrated by the low filter 22, and the voltage-to-current converter 25 outputs the tracking control signal IF, so that the current controlled oscillator 15 of the PLL circuit 1 is controlled. If the frequency of the oscillation signal VF ultimately approaches the frequency of the input horizontal synchronous signal HI and therefore enters in the capture range, the PLL circuit 1 is put into the locked condition, similarly to the prior art example. Thus, the oscillation signal VF is in synchronism with the horizontal synchronous signal HI.

Figure 4A:
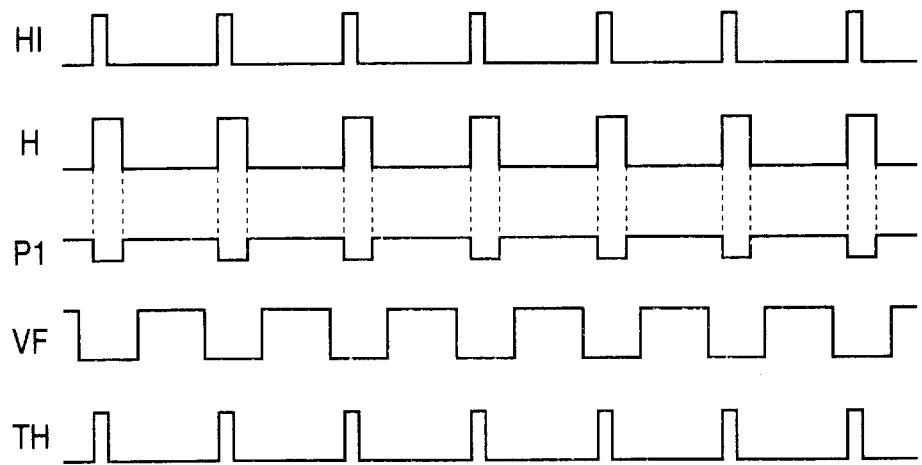
FIG. 4A and 4B are timing charts showing waveforms of various signals in the circuit shown in FIG. 3, for illustrating an operation of the circuit shown in FIG. 3.
Figure 4B:
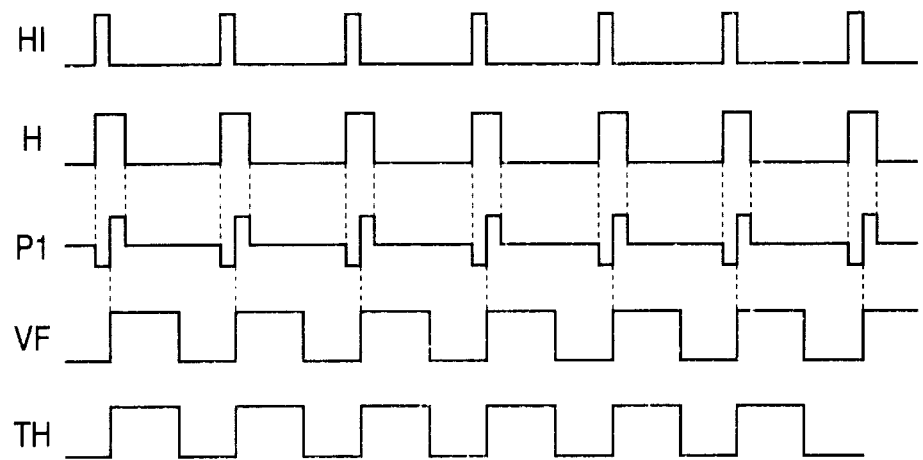

If the PLL circuit 1 is put into the locked condition as shown in FIG. 4B, the phase relation between the horizontal synchronous pulse H and the oscillation signal VF is inverted, as seen from comparison between FIGS. 4A and 4B. As a result, the synchronism detecting circuit 26 outputs the synchronism detecting signal SD of a high level to the switch circuit 27. In response to the high level synchronism detecting signal SD, the switch circuit 27 selects the oscillation signal VF and outputs the oscillation signal VF as the selected signal SH to the waveform shaper 28.

In general, in a video display apparatus of this type, when the PLL circuit 1 is in the unlocked condition, since the displayed image flows, a blanking is internally performed, so that the image is not displayed. In other words, when an image is displayed, the oscillation signal VF is necessarily phase-locked with the input horizontal synchronous signal HI, and therefore, there is no problem even if the oscillation signal VF is supplied to the frequency-to-voltage converter 21 in the tracking circuit 2A.

Figure 5:
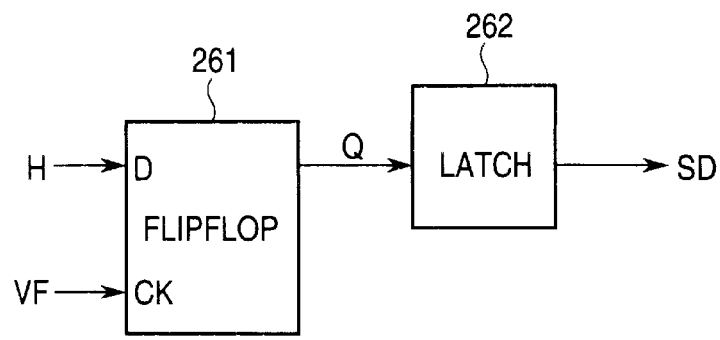
FIG. 5 is a block diagram of the synchronism detecting circuit included in the circuit shown in FIG. 3.

Now, referring to FIG. 5, there is shown a block diagram of the synchronism detecting circuit 26. The synchronism detecting circuit 26 includes a D-type flipflop 261 having a data input D connected to receive the horizontal synchronous pulse H and the clock input CK connected to receive the oscillation signal VF, and a latch circuit 262 receiving and latching a Q output of the flipflop 261 for outputting the latched signal as the synchronism detecting signal SD.

Returning to FIGS. 4A and 4B, an operation of the synchronism detecting circuit 26 will be described. FIG. 4A shows the unlocked condition of the PLL circuit 1, and FIG. 4B shows the locked condition of the PLL circuit 1.

In the unlocked condition shown in FIG. 4A, a high level period of the horizontal synchronous pulse H outputted from the waveform shaper 11 is not coincident with a rising edge of the oscillation signal VF. Therefore, the Q output of the flipflop 261 is maintained at the low level, and therefore, the latch circuit 262 latches the low level and outputs the synchronism detecting signal SD of the low level.

On the other hand, in the locked condition shown in FIG. 4B, the high level period of the horizontal synchronous pulse H is coincident with the rising edge of the oscillation signal VF. Therefore, the Q output of the flipflop 261 is brought to the high level, and therefore, the latch circuit 262 latches the high level and outputs the synchronism detecting signal SD of the high level.

Figure 6:
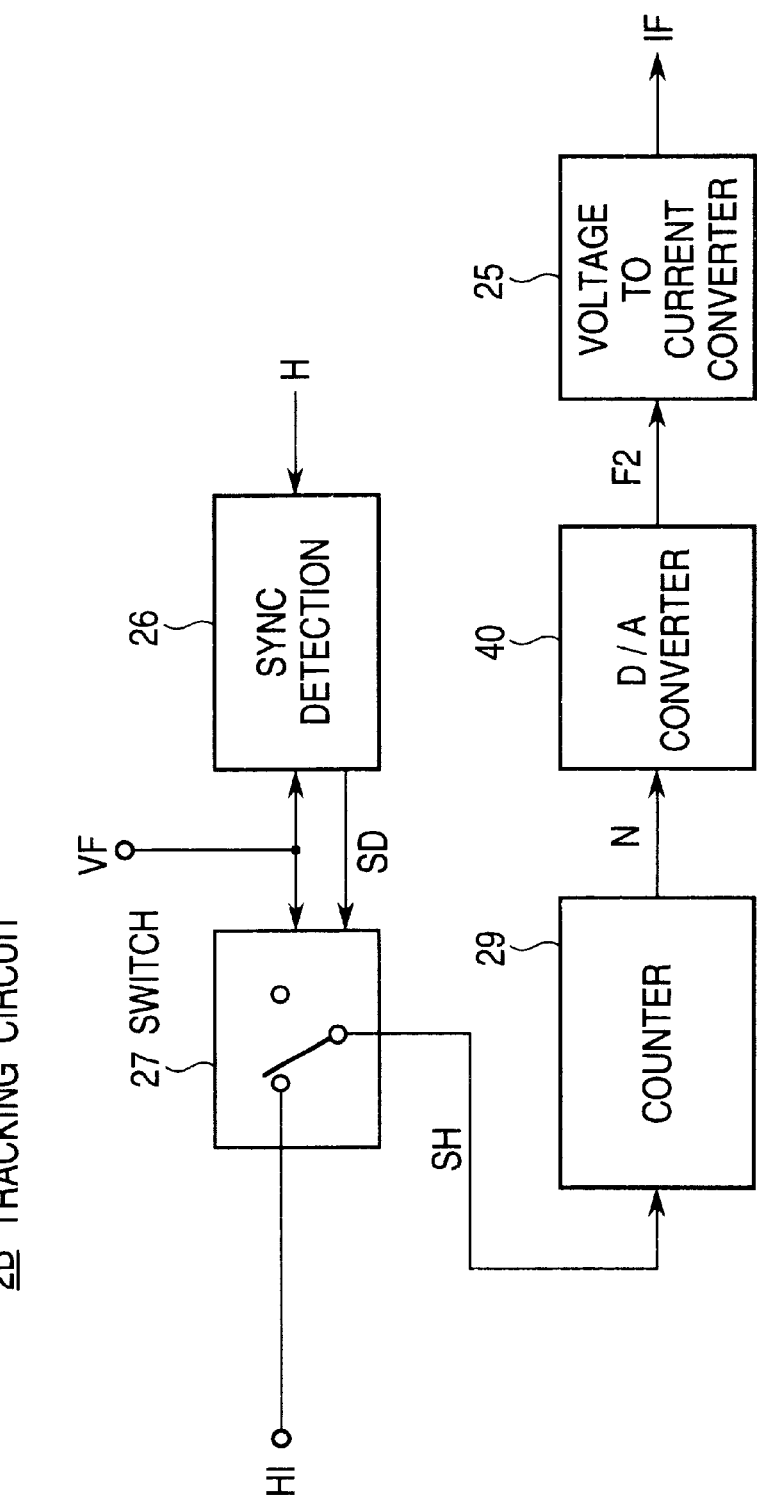
FIG. 6 is a block diagram of a modification of the tracking circuit in the circuit shown in FIG. 3.

Now, referring to FIG. 6, there is shown a block diagram of a modification of the tracking circuit shown in FIG. 3. This modified tracking circuit is generally designated with Reference Numeral 2B. In FIG. 6, elements similar to those shown in FIG. 3 are given the same Reference Numerals, and explanation thereof will be omitted for simplification of description.

As seen from comparison between FIGS. 3 and 6, the tracking circuit 2B includes, in place of the frequency-to-voltage converter 21, a counter 29 counting the selected signal SH for outputting a count value N, and a D/A (digital-to-analog) converter 40 for digital-to-analog-converting the count value N to a signal F2 which corresponds to the integrated signal F2 in the first embodiment.

In this modification, when the PLL circuit 1 is put in the phase-locked condition, since the selected signal SH is switched to the oscillation signal VF, it is possible to elevate a frequency-to-voltage conversion precision of the signal F2.

In the case of using the counter as the frequency-to-voltage converter, since the horizontal synchronous pulse H was frequency-to-voltage-converted in the prior art example, in order to prevent an error attributable to missing of the horizontal synchronous signal during the vertical blanking period, it is necessary to conduct the frequency-to-voltage conversion during one vertical synchronism period. If the frequency-to-voltage conversion is conducted during more than one vertical synchronism period, since the counter continues to count during the vertical blanking period, an error is generated in the converted value. For example, assume that the horizontal synchronous signal frequency is 100 KHz, the vertical synchronous signal frequency is 100 Hz, the number of the horizontal synchronous signals during the vertical blanking period is 10, and a counting reference signal has a period of 20 ms. Under this assumption, if the frequency is counted during the 20 ms period of the counting reference signal, the number of the horizontal synchronous signals during the period of 20 ms, is expressed as follows:

20 ms×100 KHz−2=1980 pulses

Accordingly, there occurs a counting error corresponding to the 20 pulses. The 20 pulses are because two vertical blanking periods are included in the period of 20 ms, and therefore, 20 horizontal synchronous signals are missed.

In order to prevent the above mentioned counting error, it is necessary to set the counting reference signal shorter than the vertical synchronous signal period. Here, in the case of a multiscan type video display apparatus having a variable horizontal synchronous signal frequency, the frequency of the vertical synchronous signal changes from in the range of 40 Hz to 160 Hz, for example. Therefore, the reference signal is required to be shorter than a period corresponding to the maximum vertical synchronous signal frequency, namely, 1/160 Hz=6.25 ms. Furthermore, considering that the horizontal synchronous signal is not supplied during the vertical blanking period, the period of the reference signal is required to be sufficiently shorter than 6.25 ms, and a reasonable value is on the order of 5 ms. In this case, the frequency detection sensitivity lowers as expressed by the following equation:

1/5 ms=±200 Hz

In the shown embodiment, when the PLL circuit 1 is in the locked condition, since the signal supplied to the counter 29 is switched to the oscillation signal VF, it is no longer necessary to conduct the frequency-to-voltage conversion only during one vertical synchronism period. The longer the reference signal is, the higher the frequency conversion precision becomes. For example, if the reference signal is set to have the period of 20 ms, the frequency detection sensitivity is elevated as expressed by the following equation:

1/20 ms=±50 Hz

Another advantage of the first modified tracking circuit 2B is that the low pass filter 22, the voltage supply 23 or 23A and the diode 24 which were required in the prior art example and in the first embodiment, are no longer necessary. The reason for this is that, because the input horizontal synchronous signal frequency is converted by use of the counter, it is no longer necessary to remove a high frequency component and to integrate the converted voltage by use of the low pass filter, and the free running oscillation control voltage corresponding to the minimum oscillation frequency can be set by an initial value of the counter.

Figure 7:
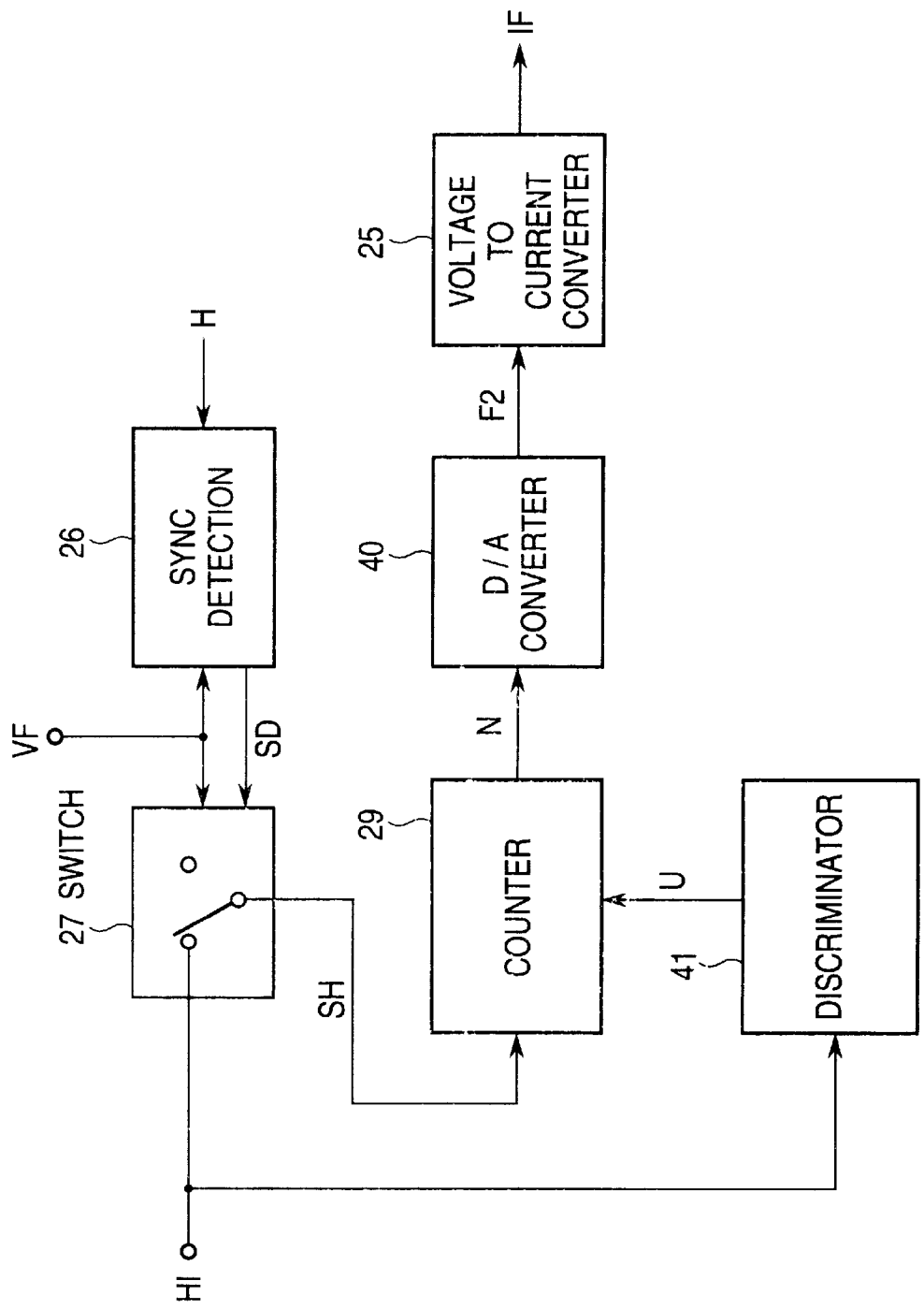
FIG. 7 is a block diagram of another modification of the tracking circuit in the circuit shown in FIG. 3.

Now, referring to FIG. 7, there is shown a block diagram of another modification of the tracking circuit in the circuit shown in FIG. 3. This modified tracking circuit is generally designated with Reference Numeral 2C. In FIG. 7, elements similar to those shown in FIG. 6 are given the same Reference Numerals, and explanation thereof will be omitted for simplification of description.

As seen from comparison between FIGS. 6 and 7, the second modified tracking circuit 2C includes, in addition to the first modified tracking circuit 2B, a discriminator 41 receiving the input horizontal synchronous signal HI for discriminating presence/absence of the horizontal synchronous signal HI to generate a presence/absence discriminating signal U, which is supplied to the counter 29 as a control signal.

Next, an operation of the second modified tracking circuit 2C will be described with reference to FIGS. 3 and 7 and FIG. 8 which is a timing chart for illustrating an operation of the circuit shown in FIG. 3 incorporating the circuit shown in FIG. 7.

First, if the horizontal synchronous signal HI is applied, the presence/absence discriminating signal U is brought to the high level, so that the counter 29 counts the horizontal synchronous pulse H, and the D/A converter 40 outputs the corresponding voltage signal F2, similarly to the first modified tracking circuit 2B.

Figure 8:
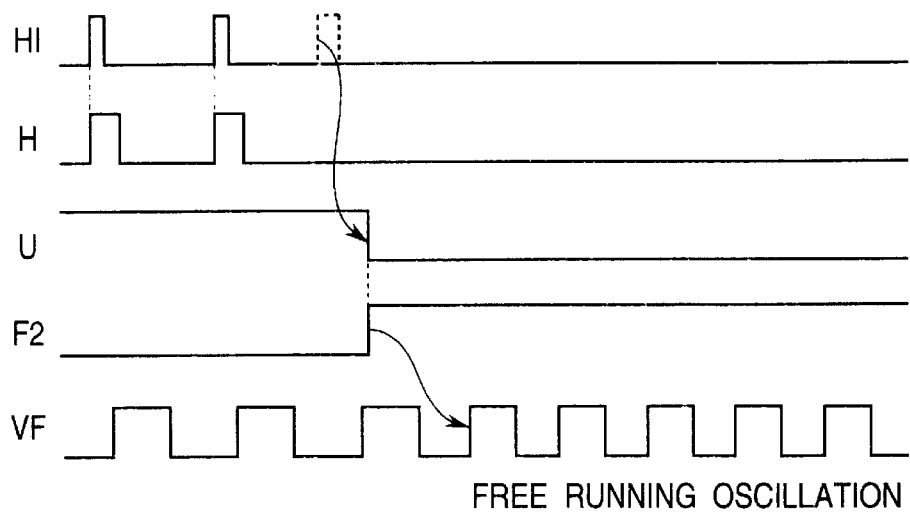
FIG. 8 is a timing chart for illustrating an operation of the circuit shown in FIG. 3 incorporating the circuit shown in FIG. 7.

If application of the horizontal synchronous signal HI is interrupted as a ghost signal HI located at a third position in FIG. 8, the discriminator 41 detects the absence of the horizontal synchronous signal HI and brings the presence/absence discriminating signal U to the low level, to cause the counter 29 to output a constant count value corresponding to the free running oscillation. As a result, the output signal F2 of the D/A converter 40 changes to the voltage corresponding to the free running oscillation. By the control signal corresponding to this voltage of the output signal F2, the current controlled oscillator 15 of the PLL circuit 1 generates the oscillation signal VF having the free running oscillation frequency. Thus, this free running oscillation frequency can be freely set by arbitrarily setting the above mentioned constant count value of the counter 29.

Now, referring to FIG. 9, there is shown a block diagram of still another modification of the tracking circuit in the circuit shown in FIG. 3. This modified tracking circuit is generally designated with Reference Numeral 2D. In FIG. 9, elements similar to those shown in FIGS. 3 and 7 are given the same Reference Numerals, and explanation thereof will be omitted for simplification of description.

As seen from comparison between FIGS. 3 and 9, the third modified tracking circuit 2D is characterized in that the discrimination 41 is added to the tracking circuit 2A shown in FIG. 3. In this modified tracking circuit 2D, the presence/absence discriminating signal U outputted from the discriminator 41 is supplied to a voltage supply 23B, so that the voltage supply 23B is selectively put either into an operating condition when the presence/absence discriminating signal U is at the low level, or into non-operating condition when the presence/absence discriminating signal U is at a high level. Therefore, since the voltage supply 23B operates only when no horizontal synchronous signal H1 is applied, it is possible to freely set the voltage value of the free running oscillation voltage signal FX outputted from the voltage supply 23B. Therefore, it is possible to freely set the free running oscillation frequency of the oscillation signal VF.

As mentioned above, in the video display apparatus in accordance with the present invention, the tracking circuit includes the switch circuit for selecting the horizontal synchronous signal to supply the horizontal synchronous signal to the tracking circuit when the phase-locked loop is in an unlocked condition, and for selecting the oscillation signal of the phase-locked loop to supply the oscillation signal to the tracking circuit when the phase-locked loop is in a locked condition. With this arrangement, in the unlocked condition of the phase-locked loop in which the oscillation signal of the phase-locked loop is not in synchronism with the horizontal synchronous signal, a horizontal synchronous pulse is supplied to the frequency-to-voltage converter in the tracking circuit to generate the oscillation frequency control signal, and in the locked condition of the phase-locked loop in which the oscillation signal of the phase-locked loop is in synchronism with the horizontal synchronous signal, the oscillation signal of the phase-locked loop is supplied to the frequency-to-voltage converter in the tracking circuit to generate the oscillation frequency control signal. Therefore, even when the horizontal synchronous signal is missed as during the vertical blanking period of the composite video signal, no frequency conversion error occurs, and therefore, there is no variation in the horizontal synchronous output signal, with the result that the image distortion attributable to the variation of the horizontal synchronous output signal, does not occur in an upper portion of the display screen.

In the locked condition of the PLL circuit, since the oscillation signal of the PLL circuit is frequency-to-voltage-converted, it is no longer necessary to restrict the counting reference signal for the frequency converting counter, to one vertical period. In other words, since it is possible to freely elongate the counting reference signal, it is possible to elevate the frequency-to-voltage-conversion precision.

Furthermore, when no horizontal synchronous signal is applied, it is possible to freely set the free running oscillation frequency.

The invention has thus been shown and described with reference to the specific embodiments. However, it should be noted that the present invention is in no way limited to the details of the illustrated structures but changes and modifications may be made within the scope of the appended claims.

I claim:

1. A video display apparatus comprising a phase-locked loop receiving a horizontal synchronous signal for generating an oscillation signal following the frequency of said horizontal synchronous signal, a tracking circuit for generating a tracking control signal for moving a frequency of said oscillation signal into a predetermined capture range of said phase-locked loop when said frequency of said horizontal synchronous signal changes, so that said frequency of said oscillation signal follows said frequency of said horizontal synchronous signal, and an output circuit receiving and amplifying said oscillation signal to output a horizontal output signal, said tracking circuit including a switch circuit receiving said horizontal synchronous signal and said oscillation signal to supply said horizontal synchronous signal as a selected signal to said tracking circuit when the phase-locked loop is in an unlocked condition, and to supply said oscillation signal as said selected signal to said tracking circuit when the phase-locked loop is in a locked condition.

2. A video display apparatus claimed in claim 1 wherein said tracking circuit further includes a waveform shaper receiving said selected signal from said switch circuit for generating a waveform-shaped pulse having a constant pulse width, and a frequency-to-voltage converter for converting a frequency of said waveform-shaped pulse into a voltage signal having a voltage corresponding to said frequency of said waveform-shaped pulse.

3. A video display apparatus claimed in claim 1 wherein said tracking circuit further includes a counter receiving said selected signal from said switch circuit for outputting a count value corresponding to a frequency of said selected signal, and a digital-to-analog converter for converting said count value into a voltage signal having a voltage corresponding to said count value.

4. A video display apparatus claimed in claim 3 wherein said tracking circuit further includes a discriminator for discriminating presence/absence of said horizontal synchronous signal to generate a controlled by said presence/absence discriminating signal, to generate a predetermined count value when said presence/absence discriminating signal indicates the absence of said horizontal synchronous signal.

5. A video display apparatus claimed in claim 1 wherein said tracking circuit further includes a synchronous detecting circuit for generating a synchronous detecting signal indicating which of said unlocked condition and said locked condition said phase-locked loop is, and wherein said switch circuit is controlled by said synchronism detecting signal to select said horizontal synchronous signal when said synchronism detecting signal indicates that said phase-locked loop is in said unlocked condition, and to select said oscillation signal when said synchronism detecting signal indicates that said phase-locked loop is in said locked condition.

6. A video display apparatus claimed in claim 5 wherein said synchronism detecting circuit includes a flipflop having a clock input receiving said oscillation signal, and a signal input receiving a waveform-shaped synchronous signal having a constant pulse width obtained by waveform-shaped said horizontal synchronous signal, said flipflop outputting a coincidence signal when a leading edge of said oscillation signal appears during a first level period of said waveform-shaped synchronous signal, and a latch circuit receiving and latching said coincidence signal for outputting the latched coincidence signal as said synchronism detecting signal.

7. A video display apparatus claimed in claim 1 wherein said tracking circuit further includes a discriminator for discriminating presence/absence of said horizontal synchronous signal to generate a presence/absence discriminating signal, and a voltage supply controlled by said presence/absence discriminating signal, to generate a predetermined voltage when said presence/absence discriminating signal indicates the absence of said horizontal synchronous signal.

* * * * *